US008618929B2

(12) United States Patent
Ganapathy et al.

(10) Patent No.: US 8,618,929 B2
(45) Date of Patent: Dec. 31, 2013

(54) WIRELESS CONVEYOR BELT CONDITION MONITORING SYSTEM AND RELATED APPARATUS AND METHOD

(75) Inventors: Viswanath Ganapathy, Bangalore (IN); Vijayakumar Basalingappa, Gulbarga (IN); Vijendran Gopalan Venkoparao, Bangalore (IN); Neil Freeman, Perth (AU)

(73) Assignee: Honeywell International Inc., Morristown, NJ (US)

( * ) Notice: Subject to any disclaimer, the term of this patent is extended or adjusted under 35 U.S.C. 154(b) by 329 days.

(21) Appl. No.: 13/103,245

(22) Filed: May 9, 2011

(65) Prior Publication Data

US 2012/0286948 A1    Nov. 15, 2012

(51) Int. Cl.
*G08B 1/08* (2006.01)
(52) U.S. Cl.
USPC .......................................... 340/539.1; 340/679
(58) Field of Classification Search
USPC ..................................................... 340/539.1
See application file for complete search history.

(56) References Cited

U.S. PATENT DOCUMENTS

| | | | |
|---|---|---|---|
| 3,536,405 A | 10/1970 | Flower | |
| 3,802,774 A | 4/1974 | Eschler et al. | |
| 4,068,955 A | 1/1978 | Bodlaj | |
| 4,160,204 A | 7/1979 | Holmgren et al. | |
| 4,276,480 A | 6/1981 | Watson | |
| 4,311,658 A | 1/1982 | Nicoll | |
| 4,437,563 A | 3/1984 | Oriol | |
| 4,490,845 A | 12/1984 | Steinbruegge et al. | |
| 4,505,550 A | 3/1985 | Steinbruegge | |
| 4,708,483 A | 11/1987 | Lorenz | |
| 4,773,760 A | 9/1988 | Makkonen | |
| 4,797,246 A | 1/1989 | Reinke et al. | |
| 4,843,481 A | 6/1989 | Plummer | |
| 4,879,471 A | 11/1989 | Dahlquist | |
| 4,885,709 A | 12/1989 | Edgar et al. | |
| 5,013,403 A | 5/1991 | Chase | |
| 5,015,070 A | 5/1991 | Montgomery et al. | |
| 5,039,855 A | 8/1991 | Kemeny et al. | |
| 5,094,535 A | 3/1992 | Dahlquist et al. | |

(Continued)

FOREIGN PATENT DOCUMENTS

| | | |
|---|---|---|
| DE | 100 31 636 A1 | 1/2002 |
| EP | 0 843 155 A1 | 5/1998 |

(Continued)

OTHER PUBLICATIONS

"Flat Belt End Conveyor Sensors", http://www.sencon.com/en/end_make/flat_belt.html, Feb. 2008, 3 pages.

(Continued)

*Primary Examiner* — Kerri McNally

(57) ABSTRACT

A method includes transmitting first wireless signals towards a conveyor belt having multiple layers of material. The first wireless signals penetrate one or more layers in the conveyor belt. The method also includes receiving second wireless signals that have interacted with the conveyor belt. The method further includes identifying a condition of the conveyor belt using the second wireless signals and outputting an indicator identifying the condition of the conveyor belt. Identifying the condition of the conveyor belt could include identifying a thickness of at least one of the layers in the conveyor belt. This could be done by identifying pulses in the second wireless signals and using time of flight calculations.

20 Claims, 4 Drawing Sheets

(56) References Cited

U.S. PATENT DOCUMENTS

| | | | |
|---|---|---|---|
| 5,166,748 | A | 11/1992 | Dahlquist |
| 5,172,005 | A | 12/1992 | Cochran et al. |
| 5,210,593 | A | 5/1993 | Kramer |
| 5,230,923 | A | 7/1993 | Hirokawa et al. |
| 5,235,192 | A | 8/1993 | Chase et al. |
| 5,276,327 | A | 1/1994 | Bossen et al. |
| 5,365,084 | A | 11/1994 | Cochran et al. |
| 5,438,406 | A | 8/1995 | Puschell |
| 5,444,528 | A | 8/1995 | Puschell |
| 5,492,601 | A | 2/1996 | Ostermayer et al. |
| 5,541,413 | A | 7/1996 | Pearson et al. |
| 5,581,353 | A | 12/1996 | Taylor |
| 5,598,266 | A | 1/1997 | Cornuejols |
| 5,606,173 | A | 2/1997 | Concannon et al. |
| 5,694,214 | A | 12/1997 | Watanabe et al. |
| 5,696,591 | A | 12/1997 | Bilhorn et al. |
| 5,714,763 | A | 2/1998 | Chase et al. |
| 5,795,394 | A | 8/1998 | Belotserkovsky et al. |
| 5,821,536 | A | 10/1998 | Pettit |
| 5,891,306 | A | 4/1999 | Chase et al. |
| 5,987,978 | A * | 11/1999 | Whitehead ..................... 73/146 |
| 6,031,233 | A | 2/2000 | Levin et al. |
| 6,038,028 | A | 3/2000 | Grann et al. |
| 6,047,814 | A | 4/2000 | Alles et al. |
| 6,100,986 | A | 8/2000 | Rydningen |
| 6,111,649 | A | 8/2000 | Tominaga et al. |
| 6,122,042 | A | 9/2000 | Wunderman et al. |
| 6,144,446 | A | 11/2000 | Nagasaki et al. |
| 6,262,419 | B1 | 7/2001 | Huth-Fehre et al. |
| 6,281,679 | B1 | 8/2001 | King et al. |
| 6,289,600 | B1 | 9/2001 | Watts |
| 6,297,879 | B1 | 10/2001 | Yang et al. |
| 6,327,374 | B1 | 12/2001 | Piironen et al. |
| 6,356,201 | B1 * | 3/2002 | Alles .............................. 340/679 |
| 6,437,357 | B1 | 8/2002 | Weiss et al. |
| 6,441,905 | B1 | 8/2002 | Tojyo et al. |
| 6,459,488 | B1 | 10/2002 | Heffner |
| 6,476,920 | B1 | 11/2002 | Scheiner et al. |
| 6,494,446 | B1 | 12/2002 | Tomiyama et al. |
| 6,515,746 | B2 | 2/2003 | Opsal et al. |
| 6,538,751 | B2 | 3/2003 | Ono |
| 6,556,306 | B2 | 4/2003 | Jiang et al. |
| 6,565,343 | B1 | 5/2003 | Krycki |
| 6,573,999 | B1 | 6/2003 | Yang |
| 6,639,201 | B2 | 10/2003 | Almogy et al. |
| 6,643,060 | B2 | 11/2003 | Hashimoto et al. |
| 6,646,752 | B2 | 11/2003 | Chen et al. |
| 6,690,357 | B1 | 2/2004 | Dunton et al. |
| 6,700,370 | B2 | 3/2004 | Chen et al. |
| 6,731,380 | B2 | 5/2004 | Amara et al. |
| 6,731,384 | B2 | 5/2004 | Ohshima et al. |
| 6,743,337 | B1 | 6/2004 | Ischdonat |
| 6,744,052 | B1 | 6/2004 | Petersson et al. |
| 6,757,069 | B2 | 6/2004 | Bowles |
| 6,762,846 | B1 | 7/2004 | Poris |
| 6,780,284 | B2 | 8/2004 | Almi et al. |
| 6,793,854 | B1 | 9/2004 | Kirjavainen |
| 6,816,636 | B2 | 11/2004 | Cole et al. |
| 6,822,785 | B1 | 11/2004 | Chu et al. |
| 6,849,844 | B2 | 2/2005 | Khoury |
| 6,988,610 | B2 | 1/2006 | Fromme et al. |
| 7,032,740 | B2 | 4/2006 | Hochhaus et al. |
| 7,178,663 | B2 | 2/2007 | Schnell |
| 7,221,169 | B2 | 5/2007 | Jean et al. |
| 7,275,637 | B2 | 10/2007 | Brown |
| 7,345,747 | B2 | 3/2008 | Hillmann et al. |
| 7,369,240 | B1 | 5/2008 | Abbott et al. |
| 7,494,004 | B2 | 2/2009 | Stolyar et al. |
| 7,673,739 | B2 | 3/2010 | Freeman |
| 7,880,156 | B2 | 2/2011 | Shakespeare |
| 2001/0012107 | A1 | 8/2001 | Toh |
| 2003/0007161 | A1 | 1/2003 | Bowles |
| 2004/0124366 | A1 | 7/2004 | Zeng et al. |
| 2004/0207839 | A1 | 10/2004 | Gerstner et al. |
| 2004/0246493 | A1 | 12/2004 | Kim et al. |
| 2005/0018183 | A1 | 1/2005 | Shortt |
| 2005/0187478 | A1 | 8/2005 | Beaudry et al. |
| 2006/0132796 | A1 | 6/2006 | Haran |
| 2006/0132808 | A1 | 6/2006 | Jasinski et al. |
| 2006/0164643 | A1 | 7/2006 | Giakos |
| 2006/0254885 | A1 | 11/2006 | Ziegler |
| 2012/0168281 | A1 * | 7/2012 | Twigger et al. ............ 198/502.1 |

FOREIGN PATENT DOCUMENTS

| | | |
|---|---|---|
| JP | 09-067009 A | 3/1997 |
| JP | 2006-052039 A | 2/2006 |
| JP | 2008-179447 A | 8/2008 |
| WO | WO 87/07381 | 12/1987 |
| WO | WO 97/08537 A1 | 3/1997 |
| WO | WO 99/02941 A1 | 1/1999 |
| WO | WO 00/31521 A1 | 6/2000 |
| WO | WO 2006/116672 A2 | 11/2006 |

OTHER PUBLICATIONS

"Rip Detection with Sensor Loops", www.ConveyorBeltGuide.com, 2005, 2 pages.

"Sensor Guard with RFID Technology", http://www.goodyearep.com/productsdetail.aspx?id=7846, 2008, 5 pages.

Reinhard Knochel, et al., "UWB-Sensors for Industrial Applications", IEEE, 2007, 6 pages.

"Belt Inspection", Carnegie Mellon University, www.recri.cmu.edu/projects/belt_inspection, Dec. 2009, 3 pages.

"Effective Conveyor Belt Inspection for Improving Mining Productivity", U.S. Department of Energy, Office of Energy Efficiency and Renewable Energy, Oct. 2004, 2 pages.

"Belt rip prevention and detection", www.bulkhandling.com.au/news/2010/, Aug. 4, 2010, 7 pages.

"Carborough Downs saves belt with rip detection system", www.bulkhandling.com.au/news, Mar. 31, 2010, 2 pages.

"Ideas develops belt monitoring system", Australian Bulk Handling Review, May/Jun. 2010, p. 28.

"ContiTech pushes energy saving credentials", Australian Bulk Handling Review, May/Jun. 2010, p. 44-47.

"Revolutionary conveyor belt monitoring system developed in Melbourne", Australian Journal of Mining, Mar./Apr. 2010, p. 26.

* cited by examiner

WIRELESS CONVEYOR BELT CONDITION MONITORING SYSTEM AND RELATED APPARATUS AND METHOD

TECHNICAL FIELD

This disclosure relates generally to monitoring systems. More specifically, this disclosure relates to a wireless conveyor belt condition monitoring system and related apparatus and method.

BACKGROUND

Conveyor belt systems are used in a variety of industries around the world to transport large quantities of material effectively and efficiently. Physical damage to a conveyor belt or some other reduction in belt strength can cause the transport of material to stop. This may lead to delays and significant monetary losses in manufacturing, distribution, or other facilities.

The condition of a conveyor belt is often monitored by manual physical inspection of the conveyor belt. However, this approach has a number of shortcomings. For example, manual physical inspection is typically a time consuming and tedious process, particularly if a conveyor belt needs to be run over a long distance (such as several kilometers) during each inspection. Also, it may not be possible to inspect the conveyor belt at all points along its length. In addition, a conveyor belt may be damaged in between physical inspections, and the damage may go undetected for an extended period of time.

SUMMARY

This disclosure provides a wireless conveyor belt condition monitoring system and related apparatus and method.

In a first embodiment, a method includes transmitting first wireless signals towards a conveyor belt having multiple layers of material. The first wireless signals penetrate one or more layers in the conveyor belt. The method also includes receiving second wireless signals that have interacted with the conveyor belt. The method further includes identifying a condition of the conveyor belt using the second wireless signals and outputting an indicator identifying the condition of the conveyor belt.

In a second embodiment, a system includes a transmitter configured to generate first wireless signals for communication towards a conveyor belt via at least one antenna so that the first wireless signals penetrate one or more layers in the conveyor belt. The system also includes a receiver configured to receive via the at least one antenna second wireless signals that have interacted with the conveyor belt. The system further includes a signal processing unit configured to identify a condition of the conveyor belt using the second wireless signals.

In a third embodiment, an apparatus includes at least one interface configured to receive wireless signals that have interacted with a conveyor belt. The apparatus also includes at least one processing device configured to identify a condition of the conveyor belt using the wireless signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
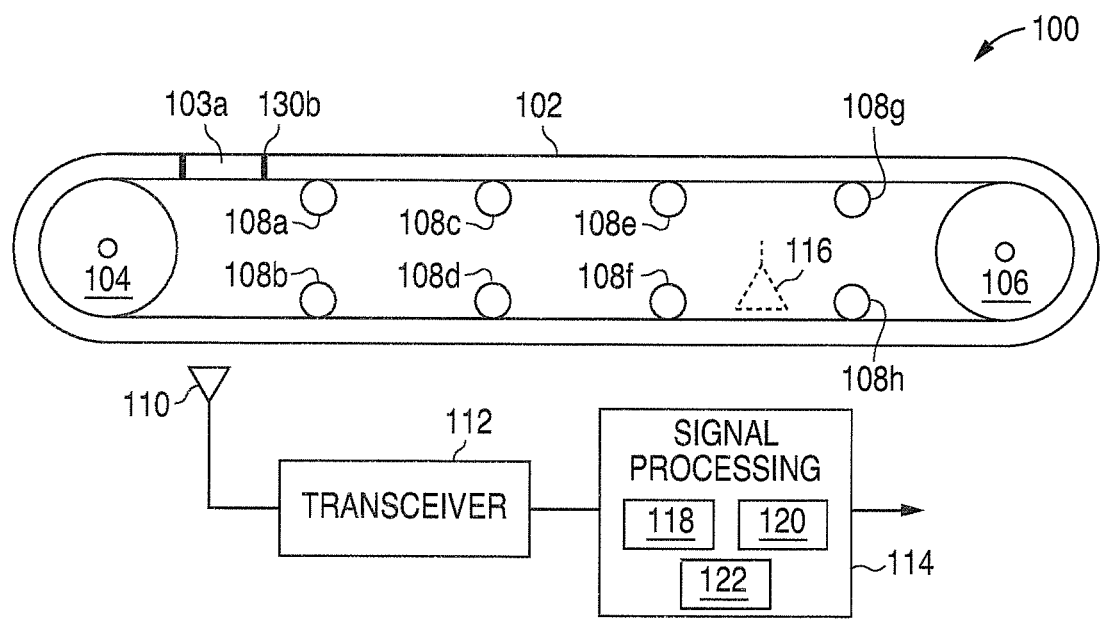
FIG. 1 illustrates an example wireless conveyor belt condition monitoring system according to this disclosure.

FIG. 1 illustrates an example wireless conveyor belt condition monitoring system 100 according to this disclosure. As shown in FIG. 1, the system 100 is used in conjunction with a conveyor belt 102 installed around a head pulley 104 and a tail pulley 106. At least one of the pulleys 104-106 could be driven by a motor, causing the pulley(s) 104-106 to rotate and move the conveyor belt 102. Note that there could be another set of one or more pulleys driven by a motor to cause movement of the conveyor belt 102. The conveyor belt 102 is supported between the pulleys 104-106 by multiple idler assemblies 108a-108h.

The conveyor belt 102 includes any suitable belt structure capable of transporting material. In some embodiments, the conveyor belt 102 includes multiple layers of rubber or other material reinforced by steel wires, steel bars, or other reinforcing structures (such as a fabric layer or layers). The pulleys 104-106 include any suitable structures around which a conveyor belt is moved. The idler assemblies 108a-108h include any suitable structures supporting a conveyor belt. Note that this represents a simplified example of a system using a conveyor belt. Additional components could be used to move the conveyor belt 102 or any other suitable conveyor belt in the system 100.

The conveyor belt 102 could suffer from various types of damage or other conditions that reduce its belt strength. For example, general use of the conveyor belt 102 could thin the rubber layer(s) or other layer(s) of material in the conveyor belt 102, reducing the strength of the conveyor belt 102. Also, the conveyor belt 102 could be damaged or worn to the point where internal parts of the conveyor belt 102 (such as steel reinforcing wires, fabric reinforcing materials, or other reinforcing structures) become exposed. In addition, the conveyor belt 102 could be formed by segments 103a that are connected to one another, and joints 103b connecting the segments 103a of the conveyor belt 102 can be damaged.

In accordance with this disclosure, the condition monitoring system 100 is used to monitor the condition of the conveyor belt 102. For example, the system 100 could take continuous and instantaneous non-contact measurements of the conveyor belt 102, such as by transmitting wireless signals towards the conveyor belt 102 and receiving wireless signals reflected from and/or transmitted through the conveyor belt 102. The signals can then be analyzed to determine the condition of the conveyor belt 102. For instance, the signals could be analyzed to estimate the thickness of one or more layers in the conveyor belt 102 and detect defects in the conveyor belt 102 (such as exposed reinforcing parts or defective belt joints). Defects can then be classified, and alarms or other notifications can be provided to appropriate personnel.

Depending on the implementation, the condition monitoring system 100 could detect defects even when the conveyor belt 102 is loaded with material. Also, the system 100 can be used with various conveyor belt sizes and belt speeds. In addition, the conveyor belt's movement around a mean position can sometimes be very high (often due to over-usage). The system 100 can handle belt movements around its mean position during the determination of the belt's condition.

In this example, the condition monitoring system 100 includes at least one antenna 110, at least one transceiver 112, and at least one signal processing unit 114. In general, a transceiver 112 can generate signals for wireless transmission towards the conveyor belt 102 via antenna(s) 110. A transceiver 112 could also receive signals wirelessly from the conveyor belt 102 via antenna(s) 110, where the received signals represent signals that have interacted with the conveyor belt 102. A signal processing unit 114 can analyze the received signals (and possibly the transmitted signals) to identify one or more characteristics of the conveyor belt 102. For instance, a signal processing unit 114 can analyze the signals to identify transitions between different layers of the conveyor belt 102. This allows the signal processing unit 114 to identify the thickness of the conveyor belt 102 or its layers using time of flight calculations, or to otherwise identify any suitable characteristic(s) of the conveyor belt 102.

Any number of antennas 110 could be used in the system 100. For example, a single antenna 110 could be used to transmit signals to and receive signals from the conveyor belt 102. Also, one antenna 110 could be used to transmit signals to the conveyor belt 102, and another antenna 110 could be used to receive signals from the conveyor belt 102. The antenna(s) 110 could be positioned on one or both sides of the conveyor belt 102. In this example, the antenna 110 is shown as being directed at the outer side of the conveyor belt 102. However, the same antenna 110 or another antenna 110 could be placed at location 116 and directed at the inner side of the conveyor belt 102. Two antennas 110 (such as transmitting and receiving antennas) could have any suitable spacing, such as a 1 m separation. Each antenna 110 includes any suitable structure for transmitting and/or receiving wireless signals, such as a radio frequency (RF) antenna.

Any number of transceivers 112 could also be used in the system 100. For example, a transceiver 112 could generate the signals to be transmitted wirelessly towards the outer side of the conveyor belt 102, and the same or different transceiver 112 could generate the signals to be transmitted wirelessly towards the inner side of the conveyor belt 102 (via a different antenna 110). Each transceiver 112 includes any suitable structure for generating signals for wireless transmission and/ or for obtaining signals received wirelessly, such as an RF transceiver. Note that any suitable wireless signals could be used. Also note that each transceiver could include a transmitter and a separate receiver.

In some embodiments, mono-static or bi-static Ultra Wideband (UWB) RADAR wireless signals can be used in the system 100. In other embodiments, LIDAR signals can be used. In general, wireless signals of any suitable frequencies can be used, including frequencies between about 3.1 GHz and about 10.6 GHz. The transmit power used to transmit wireless signals at the conveyor belt 102 and the width of pulses in the wireless signals can be selected based on the typical thickness of the conveyor belt 102. For instance, a wireless signal transmitted at a rubber layer about 4.5 mm in thickness could have a pulse width of about 40 ps. The pulse width can affect the error in thickness measurements, so the pulse width can also be based on the maximum acceptable error (which could have any suitable value, like about 1 mm).

In addition, any number of signal processing units 114 could be used in the system 100. For example, a single signal processing unit 114 could process signals received by one or multiple antennas 110, such as signals reflected off one or multiple sides of the conveyor belt 102. Each signal processing unit 114 includes any suitable structure for analyzing signals and identifying one or more characteristic(s) of a conveyor belt. Each signal processing unit 114 could, for instance, include at least one processing device 118, such as a microprocessor, microcontroller, digital signal processor, field programmable gate array, or application specific integrated circuit. Each signal processing unit 114 could also include at least one memory 120 storing instructions and data used, generated, or collected by the signal processing unit 114. Each signal processing unit 114 could further include at least one interface 122 configured to communicate with one or more external devices or systems, such as an Ethernet or other wired interface or an RF or other wireless interface. The interface 122 could be used to receive incoming wireless signals for analysis.

The system 100 shown here could be used in any suitable environment to monitor the condition of a conveyor belt 102. For example, the system 100 could be used in manufacturing, mining, distribution, or other systems for transporting materials or other products. The system 100 could also be used in grocery stores or any other industrial or other application used to move material or other products within a facility or other location.

In particular embodiments, the wireless signals transmitted from an antenna 110 towards the conveyor belt 102 could be focused to measure characteristics of a smaller specified area of the conveyor belt 102. The wireless signals transmitted towards the conveyor belt 102 could also be unfocused to measure characteristics of a larger, more general area of the conveyor belt 102.

As noted above, the system 100 can be used to estimate the thickness of the belt's layers even in the presence of belt movement. This can be done, for example, by using the time delay between the signals reflected from the surface of the belt's upper layer(s) and the signals reflected from the reinforcement. This time delay can be used to estimate the thickness of the upper layer(s) of the belt 102, and the time delay can be insensitive to belt movement. A similar approach can be employed to estimate the thickness of the bottom layer(s) of the belt 102. In addition, digital filtering can be used to eliminate the effects of periodic motion of the belt 102.

Although FIG. 1 illustrates one example of a wireless conveyor belt condition monitoring system 100, various changes may be made to FIG. 1. For example, the functional division shown in FIGURE is for illustration only. Various components in FIG. 1 could be combined, further subdivided, or omitted and additional components could be added according to particular needs. Also, FIG. 1 assumes that wireless signals are transmitted towards the conveyor belt 102 and received from the conveyor belt 102 on the same side of the conveyor belt 102. In other embodiments, a transmitter could transmit wireless signals towards one side of the conveyor belt 102, and a receiver could receive wireless signals from another side of the conveyor belt 102. Moreover, multiple receivers could be used, such as to receive wireless signals from multiple sides of the conveyor belt 102.

Figure 2A:
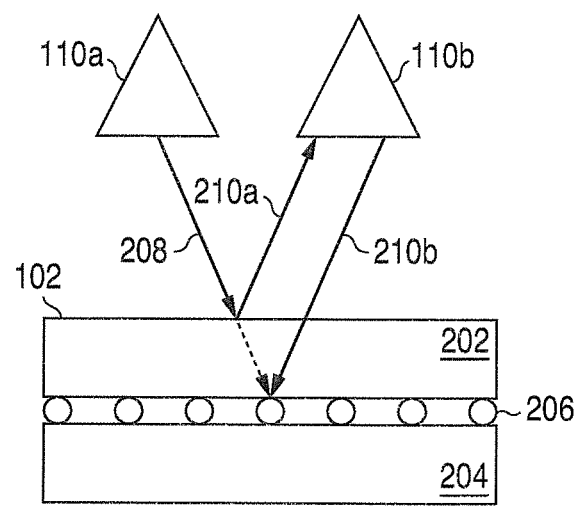
FIGS. 2A and 2B illustrate an example signal analysis for identifying a conveyor belt condition according to this disclosure.
Figure 2B:
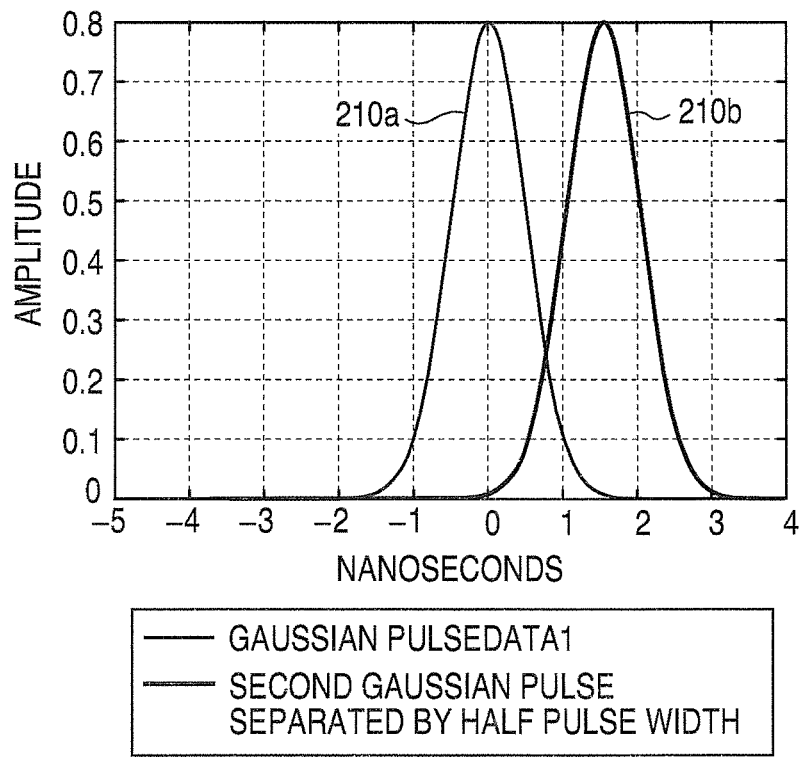

FIGS. 2A and 2B illustrate an example signal analysis for identifying a conveyor belt condition according to this disclosure. As shown in FIG. 2A, the conveyor belt 102 could include one or more upper layers 202 of material (a top cover)

and one or more lower layers 204 of material (a bottom cover). Each of these layers 202-204 could be formed from any suitable material(s), such as rubber. Also, each of these layers 202-204 could have any suitable thickness. For example, a single-layer top or bottom cover could be about 4.5 mm thick, and a multi-layer top or bottom cover could be about 9 mm thick.

The top and bottom covers are generally reinforced by wires, fabric, or some other reinforcing structure 206. The whole structure is often vulcanized together to form a multi-layered structure. The reinforcing structure 206 could be formed from any suitable material(s) and have any suitable size(s), such as steel or other wires that may be about 4.5 mm in diameter. Also, the wires in the reinforcing structure 206 could be separated by any uniform or non-uniform distance (s), such as about 1 cm.

Fabric reinforcing using a woven fabric material sandwiched between the top and bottom covers could also be used. Any other suitable reinforcing structure(s) 206 could be used.

In this example, two antennas 110a-110b are used by the system 100 of FIG. 1. One antenna 110a transmits UWB or other wireless signals 208 towards the conveyor belt 102, and the other antenna 110b receives UWB or other wireless signals 210a-210b reflected from the conveyor belt 102. The use of two antennas 110a-110b is for illustration only.

As shown in FIG. 2A, the wireless signals 210a are reflected off the top of the layer 202. Similarly, the wireless signals 210b are reflected off the bottom of the layer 202. The thickness of the layer 202 can be determined using the signals 210a-210b, such as by calculating the difference between the times of flight for the signals 210a-210b.

In this type of system, various specifications of the wireless signals can affect measurements of the conveyor belt 102. These specifications can include the duration of a pulse in the wireless signals, as well as the bandwidth and the transmit power of the wireless signals. The transmit power can affect how deeply the wireless signals can penetrate or propagate into a layer of the conveyor belt 102. Inadequate transmit power could prevent the reflection of wireless signals off the bottom surface of a layer. The bandwidth can affect the amount of information collected, such as when narrow-band signals provide less information than wider-band signals. The duration of a pulse can dictate the minimum absolute thickness that can be measured.

As shown in FIG. 2B, two pulses in the reflected signals 210a-210b are separated by a half-pulse duration. To resolve the reflections from the top and bottom of the layer 202, the delay between pulses should be greater than the half pulse duration. If two pulses arrive at a receiver with a time difference less than half the pulse duration, the receiver may not be able to receive the signal as two different pulses. This can be expressed as $$|\tau_1 - \tau_2| > \frac{\tau_p}{2},$$

where $\tau_1$ is the flight time for a pulse reflected from the top surface of a layer, $\tau_2$ is the flight time for a pulse reflected from the bottom of the layer, and r is the pulse duration. In particular embodiments, the pulse duration can be selected based on the thickness of the layer(s) 202-204, the separation of wires in the reinforcing structure 206, and the diameter of wires in the reinforcing structure 206.

Consider the following example to estimate the thickness of a rubber layer of the conveyor belt 102. Typically, rubber has a dielectric constant between about 2.5 and about 3.0. The propagation of an electromagnetic wave through rubber is slowed by a factor equal to the square root of the dielectric constant. Let the rubber layer be about 4.5 mm thick. Assume the desire is to measure the change in the thickness of the rubber layer and monitor the change in thickness until the thickness falls to about 2 mm. A pulse width can be computed for this specification as follows. The velocity of electromagnetic propagation in free space is $3 \times 10^8$ m/s. Assume that the worst case thickness of the rubber layer is 2 mm. For characterizing the thickness reliably, a receiver identifies two independent pulses separated by at least a half pulse width. The half pulse width can equal the time required for a pulse to travel through the rubber layer. Effectively, the signal reflected off the bottom of the rubber layer travels through 4 mm of rubber. Thus, the half pulse width can be determined as the effective thickness of the rubber layer divided by the velocity of propagation of a pulse through rubber. Considering the worst case velocity through rubber (when the dielectric constant is equal to 2.5), the pulse width can be computed as:

$$PulseWidth(\tau_p) = \frac{4d\sqrt{\varepsilon_r}}{c}$$

where $\varepsilon_r$ is the dielectric constant, c is the velocity of light in free space, and d is the layer thickness. For the rubber sheet parameters discussed above, the pulse width is equal to 42.16 ps. Therefore, pulses that are about 40 ps in width with appropriate amplitude can be used to estimate the thickness of a rubber layer when it is greater than or equal to 2 mm. An antenna array can be designed to measure the thickness of the layer 202 at every 2 cm along the width of the conveyor belt 102 (or at any other suitable interval depending on the spacing of the wires or other reinforcing structure 206).

The signal processing unit 114 can therefore use the time differences between pulses in the reflected signals 210a-210b to identify the thickness of a layer of material in the conveyor belt 102. The signal processing unit 114 could also detect other problems with the conveyor belt 102. For example, different attenuations or amplitudes of pulses in the reflected signal(s) 210a and/or 210b or other signal characteristics could be associated with different problems with the conveyor belt. For instance, an exposed reinforcing structure 206 of a conveyor belt 102 could reflect a wireless signal differently than a rubber layer (particularly exposed metal parts). Differences in amplitude/attenuation, time of flight, or other values could be used by the signal processing unit 114 to not only identify the existence of a problem with a conveyor belt but also to classify the problem. The signal characteristics of different problems associated with a conveyor belt could depend on the design of the conveyor belt and can be determined by capturing and analyzing signals associated with known defects.

Information about identified problems or other conditions associated with the conveyor belt 102 could be used in any suitable manner. For example, the signal processing unit 114 could store information defining the condition of the conveyor belt 102 for later retrieval and use. The signal processing unit 114 could also communicate the identified condition of the conveyor belt 102 to an external device or system, such as a display screen used by an operator. The signal processing unit 114 could further generate and output an alarm if any problems with the conveyor belt 102 are detected.

Although FIGS. 2A and 2B illustrate one example of a signal analysis for identifying a conveyor belt condition, various changes may be made to FIGS. 2A and 2B. For example, each of the layers 202-204 could be formed from multiple layers of rubber or other material. In this case, with suitable transmit power, signals may be reflected off the top and bottom of each layer, allowing the system 100 to measure the thicknesses of multiple layers simultaneously.

Figure 3:
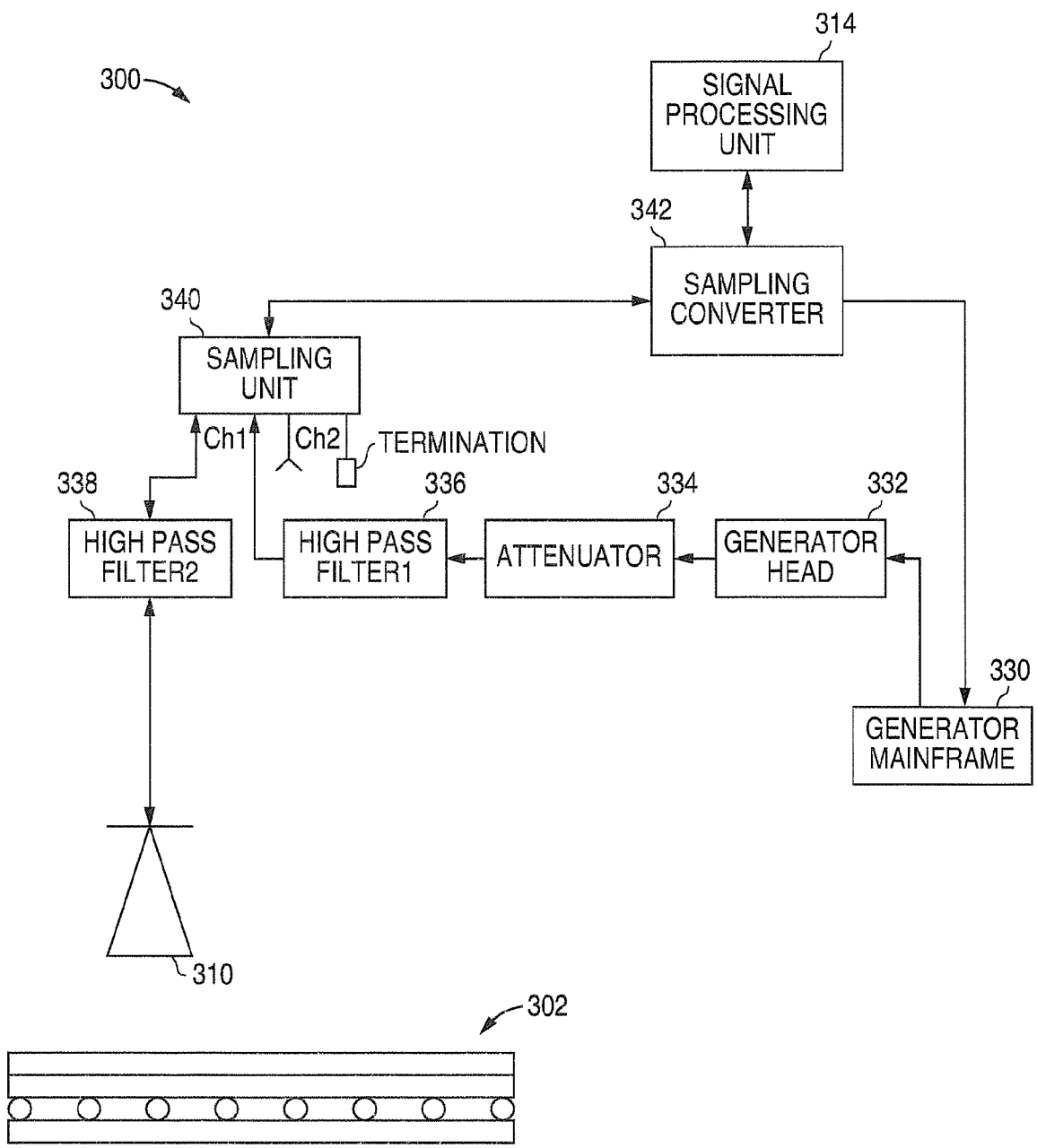
FIGS. 3 and 4 illustrate more specific example wireless conveyor belt condition monitoring systems according to this disclosure.
Figure 4:
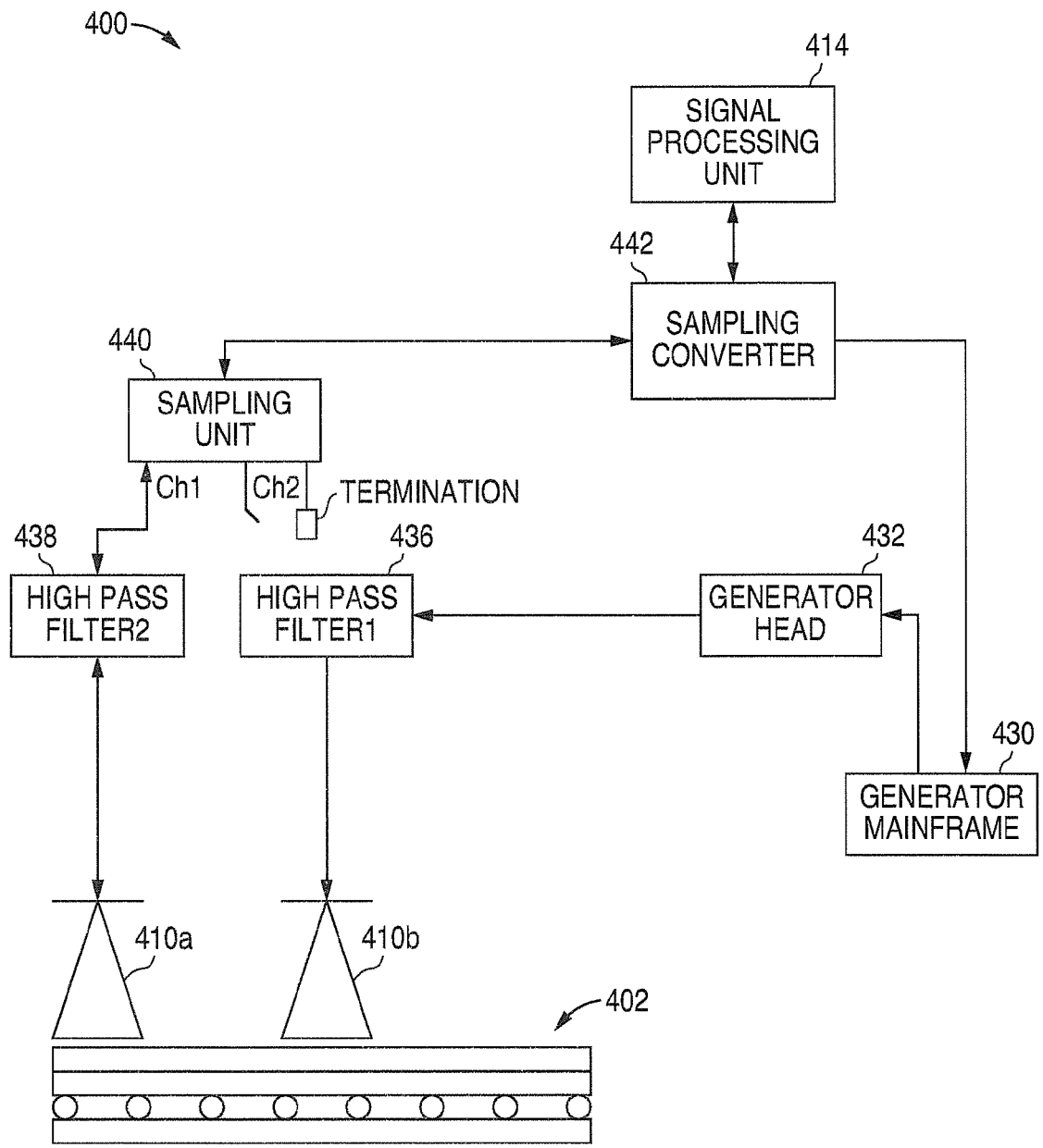

FIGS. 3 and 4 illustrate more specific example wireless conveyor belt condition monitoring systems according to this disclosure. As shown in FIG. 3, a condition monitoring system 300 is used to monitor the condition of a conveyor belt 302. While the conveyor belt 302 is shown as including multiple upper layers and one lower layer, this merely represents one example embodiment of the conveyor belt 302. The system 300 could be used with any other suitable conveyor belt, such as a conveyor belt with a single upper layer of material.

In this example, the system 300 uses a mono-static setup to examine the condition of the conveyor belt 302. In this mono-static setup, a single antenna 310 transmits wireless signals to and receives wireless signals from the conveyor belt 302. The antenna 310 could represent any suitable antenna, such as a double-ridged horn antenna that can transmit sub-nanosecond pulses to and receive reflected signals from the conveyor belt 302.

The remaining components shown in FIG. 3 could be used to implement the transceiver and signal processing functionality. In this example, the system 300 includes a pulse generator mainframe 330, a pulse generator head 332, an attenuator 334, filters 336-338, a sampling unit 340, and a sampling converter 342. The pulse generator head 332 generates very short duration pulses in order to accurately estimate layer thickness, such as pulses on the order of pico-seconds to estimate layer thickness on the order of millimeters. The attenuator 334, such as a 20 dB attenuator, protects step recovery diodes or other components in the system 300 from high power of the transmitted signals. The filters 336-338, such as 3.1 GHz high pass or other filters, are used to remove out-of-band emissions. Pulses generated by the pulse generator head 332 are provided to the antenna 310 via the attenuator 334, the filter 336, the sampling unit 340, and the filter 338.

Reflected pulses received from the conveyor belt 302 at the antenna 310 are provided to the sampling unit 340 via the filter 338. The sampling unit 340 receives the reflected signals (and optionally the transmitted signals) for sampling. The sampling unit 340 samples the signal(s) with an appropriate time resolution, such as about 2-3 ps. The samples could be captured, for instance, using a spectrum analyzer. The signal converter 342 converts the captured samples into a more suitable form, such as by using an analog-to-digital converter (ADC). The pulse generator mainframe 330 helps synchronize the generation of pulses by the pulse generator head 332 with the sampling of the received signals. For example, the pulse generator mainframe 330 can help to ensure that any couplers used to switch the antenna 310 between transmitting and receiving modes are synchronized with the generation of the pulses. Note that a mono-static setup could generally avoid the need for synchronization between the transmitter and the receiver.

Samples from the sampling converter 342 are provided to a signal processing unit 314, which could be implemented using a computing device or any other signal processing structure. The signal processing unit 314 can analyze the samples and identify one or more problems with or other conditions of the conveyor belt 302. The problems could include a worn conveyor belt 302 having a thickness that falls below a minimum acceptable value, an exposed reinforcing structure, or defects in belt joints.

The wireless signals transmitted towards the conveyor belt 302 can undergo variations at each interface within the conveyor belt 302. An interface can exist at the top and bottom of each layer of material in the conveyor belt 302, such as air-rubber, rubber-reinforcing, or rubber-rubber interfaces. Part of the wireless signals is reflected at each interface, while another part can propagate through a lower layer in a manner that depends on the material forming the lower layer. It is assumed that the dielectric constant of the material in the conveyor belt 302 is known beforehand.

The time of flight for the reflected signals varies depending on the thickness of the conveyor belt layer(s) and the distance of the conveyor belt 302 from the antenna 310. The distance of the conveyor belt 302 from the antenna 310 can determine when the first reflected pulse returns to the antenna 310 (the pulse reflected off the top surface of the conveyor belt 302). The next pulse(s) returned to the antenna 310 can be used to determine the thickness of the conveyor belt's layer(s) based on the time difference between those pulses and the first returned pulse.

As shown in FIG. 4, a wireless conveyor belt condition monitoring system 400 is used to monitor the condition of a conveyor belt 402. Again, the specific embodiment of the conveyor belt 402 is for illustration only. In this example, the system 400 uses a bi-static setup to examine the condition of the conveyor belt 402. In this bi-static setup, the system 400 includes multiple antennas 410a-410b, one for transmitting signals and the other for receiving signals. No attenuators may be required here, so the transmit signal power can be much greater than in the mono-static arrangement. In this embodiment, the system 400 includes a pulse generator mainframe 430, a pulse generator head 432, filters 436-438, a sampling unit 440, a sampling converter 442, and a signal processing unit 414. These components can be the same as or similar to the corresponding components shown in FIG. 3.

In particular embodiments, a CLEAN de-convolution algorithm can be used by a signal processing unit to estimate the time of flight for the strongest path signal(s). This can be done by placing a transmitting antenna 410a and a receiving antenna 410b on opposite sides of the conveyor belt 402, such as about 1 m apart. For the CLEAN algorithm template, a template waveform can be measured without any rubber layer or other conveyor belt layer between the antennas 410a-410b for a suitable sampling period, such as a period of 2.4 ps. The collected template (reference) signal can be used to deconvolve a received signal with the conveyor belt 402 between the antennas 410a-410b to estimate the time of flight of the strongest path(s). Both the template and the received signal through the conveyor belt 402 can be normalized between [−1 1] to compensate for variations due to amplitude changes.

As noted above, the dielectric constant of a conveyor belt can be used to determine the thickness of the conveyor belt. However, the dielectric constant of a particular conveyor belt may not be known by users of the systems described above. In particular embodiments, the dielectric constant of a particular conveyor belt can be determined as follows. The time of flight of the strongest path signal without the conveyor belt between the antennas 410a-410b can be estimated using the CLEAN algorithm. After that, a conveyor belt having a known thickness can be placed between the antennas 410a-410b, and the CLEAN algorithm can be used to estimate the time of flight of the strongest path signal through the conveyor belt. The difference between these two times of flight represents the extra delay caused by the presence of the conveyor belt. Using the known thickness of the conveyor belt and the extra time delay due to the presence of the conveyor belt, the dielectric constant of the conveyor belt can be estimated. This process could then be repeated any number of times with the same spacing between antennas 410a-410b or using different spacings, such as by increasing the separation of the antennas 410a-410b by about 3 cm (or some other value) per step. If multiple dielectric constant values are estimated, the average dielectric constant could be used as the dielectric constant of the conveyor belt. Note that this approach may be useful if the conveyor belt is formed from material having a uniform dielectric constant.

Although FIGS. 3 and 4 illustrate more specific examples of wireless conveyor belt condition monitoring systems 300 and 400, various changes may be made to FIGS. 3 and 4. For example, as noted above, the positions of various components with respect to the conveyor belts in FIGS. 3 and 4 are for illustration only. Various components, such as antennas, could be placed in any suitable locations. Also, various features shown in or described with respect to one figure could be used in other figures, such as by using a CLEAN or other deconvolution algorithm or by using the method to estimate the dielectric constant of a conveyor belt in FIG. 1 or 3.

Figure 5:
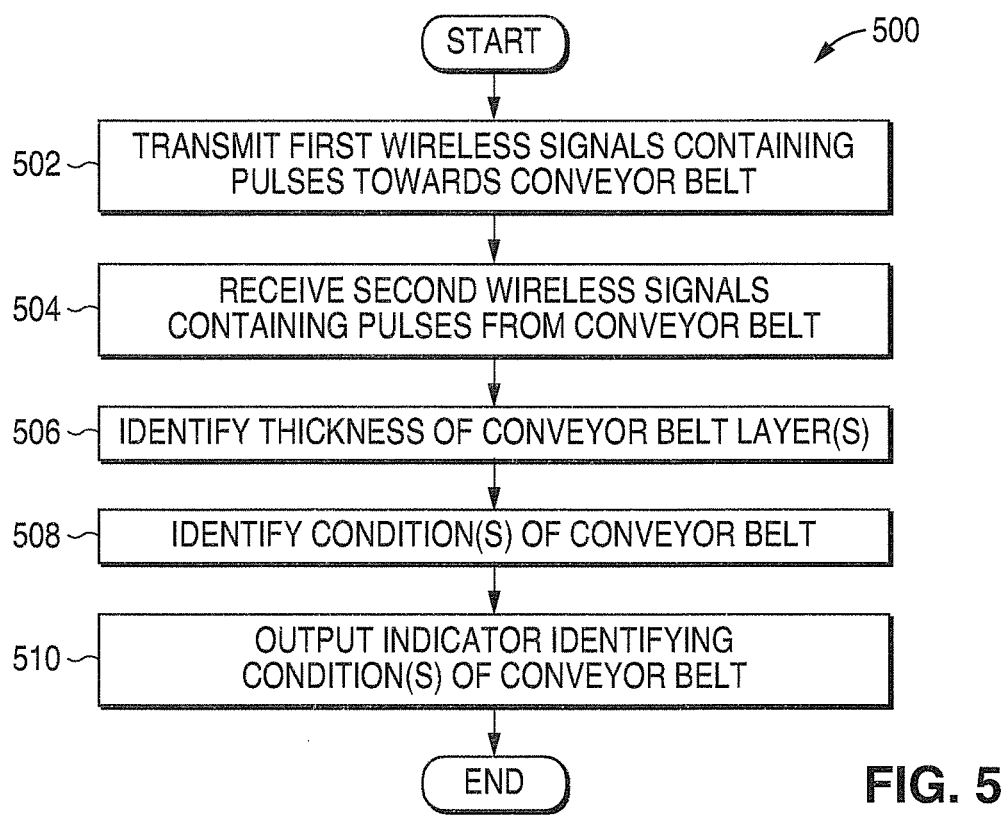
FIG. 5 illustrates an example method for wireless conveyor belt condition monitoring according to this disclosure.

FIG. 5 illustrates an example method 500 for wireless conveyor belt condition monitoring according to this disclosure. For ease of explanation, the method 500 is described with respect to the system 100 of FIG. 1. The method 500 could be used by any other suitable device or system, such as the systems 300 and 400.

As shown in FIG. 5, first wireless signals containing pulses are transmitted towards a conveyor belt at step 502. This could include, for example, an antenna 110a transmitting the wireless signals 208 towards the conveyor belt 102. The pulses in the wireless signals 208 could have a duration selected based on the minimum absolute thickness that can be measured and/or the maximum acceptable error in a thickness measurement.

Second wireless signals containing the pulses are received from the conveyor belt at step 504. This could include, for example, the antenna 110b receiving wireless signals 210a-210b that have been reflected from or otherwise interacted with the conveyor belt 102. The different received wireless signals 210a-210b contain pulses that are separated by a distance based on the thickness of the conveyor belt's layer(s).

A thickness of one or more conveyor belt layers is identified at step 506. This could include, for example, the signal processing unit 114 using a CLEAN deconvolution algorithm or other algorithm to identify the times of flight between pulses in the received wireless signals. The thickness of one or more layers can then be determined using the times of flight.

One or more conditions associated with the conveyor belt are identified at step 508. This could include, for example, determining whether the thickness of the conveyor belt's layer(s) has fallen below a threshold thickness. This could also include analyzing the reflected signals to determine whether the signals reflected off an exposed reinforcing structure or are indicative of a defective belt joint. An indicator can then be output identifying the condition(s) associated with the conveyor belt at step 510. The indicator could be provided to a user device, stored for later use, or used in any other suitable manner.

Although FIG. 5 illustrates one example of a method 500 for wireless conveyor belt condition monitoring, various changes may be made to FIG. 5. For example, while shown as a series of steps, various steps in FIG. 5 could overlap, occur in parallel, or occur multiple times.

Note that while the above description has described the use of wireless signals to detect and classify conveyor belt faults, this approach can be combined with other approaches. For example, the systems described above could use wireless signals to provide an accurate estimate of the thickness of a conveyor belt. This information can then be used in conjunction with other sensors (such as video sensors) to classify any defects on the surface of the belt. Possible defects include surface tears, wearing of the belt, and belt rips. Other condition information that can be obtained includes an estimation of the quality of the spliced belt joints.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   transmitting first wireless signals towards a conveyor belt comprising multiple layers of material, the first wireless signals penetrating and reflecting off more than one layer in the conveyor belt;
   receiving second wireless signals that have interacted with the conveyor belt;
   identifying a condition of the conveyor belt using the second wireless signals; and
   outputting an indicator identifying the condition of the conveyor belt.

2. The method of claim 1, wherein identifying the condition of the conveyor belt comprises:
   identifying a thickness of at least one of the layers in the conveyor belt; and determining that the conveyor belt is worn when the thickness of the at least one layer is below a threshold.

3. The method of claim 2, wherein identifying the thickness of the at least one layer comprises:
   identifying pulses in the second wireless signals that have reflected off different surfaces of the at least one layer; and
   using time of flight calculations with the identified pulses to determine the thickness of the at least one layer.

4. The method of claim 3, wherein using the time of flight calculations comprises:
   using a deconvolution algorithm to identify the second wireless signals that are strongest path signals;
   determining times of flight using the pulses in the strongest path signals; and
   using a time difference between the times of flight to determine the thickness of the at least one layer.

5. The method of claim 1, wherein identifying the condition of the conveyor belt comprises:
   determining whether pulses in the second wireless signals are indicative of an exposed reinforcing structure or one or more defective belt joints.

6. The method of claim 1, wherein:
   transmitting the first wireless signals comprises transmitting first wireless signals at each of upper and lower covers of the conveyor belt;
   receiving the second wireless signals comprises receiving second wireless signals from each cover of the conveyor belt; and
   identifying the condition of the conveyor belt comprises identifying the condition of the upper and lower covers of the conveyor belt.

7. The method of claim 1, wherein identifying the condition of the conveyor belt occurs when the conveyor belt is loaded with material, when the conveyor belt is unloaded, and when the conveyor belt moves around a mean position.

8. A system comprising:
   a transmitter configured to generate first wireless signals for communication towards a conveyor belt via at least one antenna so that the first wireless signals penetrate one or more layers in the conveyor belt;
   a receiver configured to receive via the at least one antenna second wireless signals that have interacted with the conveyor belt; and
   a signal processing unit configured to identify a condition of the conveyor belt using the second wireless signals;
   wherein the transmitter is configured to transmit the first wireless signals at each of upper and lower covers of the conveyor belt;
   wherein the receiver is configured to receive the second wireless signals from each cover of the conveyor belt; and
   wherein the signal processing unit is configured to identify a condition of the upper cover and a condition of the lower cover of the conveyor belt.

9. The system of claim 8, wherein the transmitter and the receiver form a transceiver.

10. The system of claim 8, wherein the signal processing unit is configured to identify the condition of the conveyor belt by:
    identifying a thickness of at least one of the layers in the conveyor belt; and
    determining that the conveyor belt is worn when the thickness of the at least one layer is below a threshold.

11. The system of claim 10, wherein the signal processing unit is configured to identify the thickness of the at least one layer by:
    identifying pulses in the second wireless signals that have reflected off different surfaces of the at least one layer; and
    using time of flight calculations with the identified pulses to determine the thickness of the at least one layer.

12. The system of claim 11, wherein the signal processing unit is configured to use the time of flight calculations by:
    using a deconvolution algorithm to identify the second wireless signals that are strongest path signals;
    determining times of flight using the pulses in the strongest path signals; and
    using a time difference between the times of flight to determine the thickness of the at least one layer.

13. The system of claim 8, wherein the signal processing unit is configured to identify the condition of the conveyor belt by:
    determining whether pulses in the second wireless signals are indicative of an exposed reinforcing structure or one or more defective belt joints.

14. The system of claim 8, wherein the transmitter is configured to generate first wireless signals that penetrate and reflect off more than one layer in the conveyor belt.

15. An apparatus comprising:
    at least one interface configured to receive wireless signals that have interacted with a conveyor belt; and
    at least one processing device configured to identify a condition of the conveyor belt using the wireless signals;
    wherein the at least one processing device is configured to identify the condition of the conveyor belt by determining whether pulses in the wireless signals are indicative of an exposed reinforcing structure or one or more defective belt joints.

16. The apparatus of claim 15, wherein the at least one processing device is configured to identify the condition of the conveyor belt by:
    identifying a thickness of at least one of the layers in the conveyor belt; and
    determining that the conveyor belt is worn when the thickness of the at least one layer is below a threshold.

17. The apparatus of claim 16, wherein the at least one processing device is configured to identify the thickness of the at least one layer by:
    identifying pulses in the wireless signals that have reflected off different surfaces of the at least one layer; and
    using time of flight calculations with the identified pulses to determine the thickness of the at least one layer.

18. The apparatus of claim 17, wherein the at least one processing device is configured to use the time of flight calculations by:
    using a deconvolution algorithm to identify the wireless signals that are strongest path signals;
    determining times of flight using the pulses in the strongest path signals; and
    using a time difference between the times of flight to determine the thickness of the at least one layer.

19. The apparatus of claim 15, wherein the at least one interface is configured to receive wireless signals that have penetrated and reflected off more than one layer in the conveyor belt.

20. The apparatus of claim 15, wherein the at least one processing device is configured to identify the condition of the conveyor belt when the conveyor belt is loaded with material, when the conveyor belt is unloaded, and when the conveyor belt moves around a mean position.

* * * * *